United States Patent [19]

Clark et al.

[11] Patent Number: 5,585,786

[45] Date of Patent: Dec. 17, 1996

[54] OPTICAL TANK-LEVEL GAUGE

[75] Inventors: Reece R. Clark, Redwood City, Calif.; Gaston C. Barmore, Jr., Pearland, Tex.

[73] Assignee: Midland Manufacturing Corp., Skokie, Ill.

[21] Appl. No.: 550,386

[22] Filed: Oct. 30, 1995

[51] Int. Cl.$^6$ .................................................. G08B 21/00
[52] U.S. Cl. ........................ 340/623; 340/619; 340/620; 73/313; 73/319
[58] Field of Search .................................. 340/618, 619, 340/623, 624, 620; 73/290 R, 305, 306, 307, 319, 313

[56] References Cited

U.S. PATENT DOCUMENTS

| | | | |
|---|---|---|---|
| 4,079,627 | 3/1978 | Gundlach | 73/313 |
| 4,286,464 | 9/1981 | Tauber et al. | 340/619 |
| 4,450,722 | 5/1984 | Keyes, IV et al. | 73/293 |
| 4,501,972 | 2/1985 | Foerster, Jr. et al. | 250/577 |
| 4,739,786 | 4/1988 | Parkinson | 340/620 |
| 4,745,293 | 5/1988 | Christensen | 340/619 |
| 4,768,377 | 9/1988 | Habelmann et al. | 73/313 |
| 4,857,894 | 8/1989 | Dahl | 340/619 |
| 4,866,428 | 9/1989 | Hinkle | 340/619 |
| 5,054,319 | 10/1991 | Fling | 73/319 |
| 5,073,253 | 12/1991 | Bishop et al. | 209/164 |
| 5,124,686 | 6/1992 | White et al. | 340/624 |
| 5,142,793 | 9/1992 | Crane | 33/763 |
| 5,146,784 | 9/1992 | Maresca, Jr. et al. | 73/313 |
| 5,156,042 | 10/1992 | Carlin et al. | 73/49.2 |
| 5,245,874 | 9/1993 | Baer | 73/313 |
| 5,421,193 | 6/1995 | Carlin et al. | 73/49.2 |

*Primary Examiner*—Jeffery Hofsass
*Assistant Examiner*—Davetta Woods
*Attorney, Agent, or Firm*—Emrich & Dithmar

[57] ABSTRACT

An optical tank-level gauge includes an elongated gauge rod magnetically coupled at its lower end to a float for rising and falling with the liquid level. The outer surface of the rod is provided along most of its length with alternating reflecting and non-reflecting circumferential stripes of equal height, the rod having non-reflecting zones at its opposite ends. An optical read head is fixed on the tank and includes LEDs for illuminating the rod and four optical sensors spaced apart longitudinally along the rod and arranged into quadrature pairs relative to the stripes, so that each pair reads a longitudinal extent of the rod substantially equal to the height of one stripe. Each of the non-reflecting end zones has a height such that, in either the full or empty condition, the fields of view of all four optical sensors will be completely within one or the other of the end zones. The LEDs are modulated on and off at a high frequency and the output of each optical sensor is rectified and compared to a predetermined threshold to produce a logic level output corresponding to the nature of the stripe being read and which is substantially insensitive to ambient light. A microcontroller controls the modulation of the LEDs and processes the logic levels produced by the detection circuitry to integrate a serial output pulse train indicative of the liquid level. The processor can be switched between a continuous readout mode and a mode to generate discrete alarm level signals.

18 Claims, 3 Drawing Sheets

OPTICAL TANK-LEVEL GAUGE

BACKGROUND OF THE INVENTION

1. Field of the Invention

The present invention relates to gauge systems for indicating the level of liquid intake and, particularly, to electronic gauges of the type which can produce either an alarm signal or an indication of tank liquid level.

2. Description of the Prior Art

U.S. Pat. No. 5,124,686 discloses a magnetic tank level alarm system including an elongated rod coupled to a float which rises and falls with the liquid level. Magnets on the rod actuate switches to trigger alarms when certain liquid levels are reached. That type of system can be subject to false alarm signals if the liquid level rapidly changes or apparently rapidly changes, such as in response to turbulence in the liquid or the like. Also, while that prior system can provide a direct visual indication to a user of the liquid level, it does not provide any remotely detectable liquid level indication.

U.S. Pat. No. 5,245,874 discloses an optical liquid level gauge which utilizes a slotted or apertured elongated surface coupled to a float. Light directed through the slots is detected by a pair of optical detectors arranged in quadrature relationship to produce a pulsating output signal. The quadrature relationship of the detectors permits an indication of the direction in which the level is changing. However, this particular sensor is embodied in a total precipitation gauge and is arranged to indicate only the maximum liquid level reached. Furthermore, this prior art optical gauge is sensitive to ambient light, which can produce false readings.

SUMMARY OF THE INVENTION

It is an object of the present invention to provide an improved liquid level gauge which avoids the disadvantages of prior gauges while affording additional structural and operating advantages.

An important feature of the invention is the provision of an optical float gauge which minimizes sensitivity to ambient light.

In connection with the foregoing feature, a further feature of the invention is the provision of an optical float gauge of the type set forth, which utilizes multiple quadrature pairs of optical detectors.

Another feature of the invention is the provision of an optical float gauge of the type set forth, which can indicate the integrity of the sensing apparatus.

A still further feature of the invention is the provision of an optical float gauge of the type set forth, which can operate in either a continuous readout or a discrete alarm level mode.

Certain ones of these features are attained by providing a float gauge for measuring liquid level in a vessel comprising: a float element floating in the liquid for rising and falling with the level thereof, an elongated code-bearing surface coupled at one end thereof to the float element for rising and falling therewith, a code sensor fixed relative to the vessel and disposed for sensing movement for the code-bearing surface and generating corresponding electrical signals, the code sensor including four optical sensors coupled relative to the code-bearing surface for generating electrical signals in a relationship indicating the direction and rate of movement of the code-bearing surface and the integrity of the code sensor, and a processor coupled to the code sensor for interpreting the electrical signals and generating corresponding output signals indicative of the liquid level.

Other features of the invention are attained by providing a float gauge for measuring liquid level in a vessel comprising: a float element floating in the liquid for rising and falling with the level thereof; an elongated code-bearing surface coupled at one end thereof to the float element for rising and falling therewith and including reflecting and non-reflecting portions; and a code sensor, the code sensor including a light source disposed for illuminating the code-bearing surface, a control circuit coupled to the light source for modulating the light output thereof, an optical sensor for detecting modulated light reflected from the code-bearing surface and generating electrical signals in response thereto, and detection circuitry coupled to the optical sensor for demodulating the electrical signals and comparing the voltage level of the electrical signals with a predetermined threshold voltage level.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
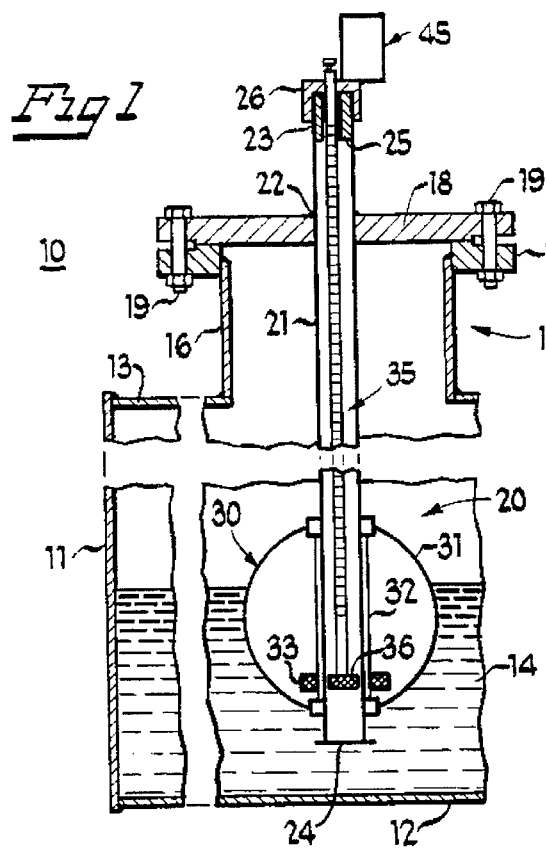
FIG. 1 is a fragmentary view in vertical section of a portion of a tank in which is mounted a tank-level gauge constructed in accordance with and embodying the features of the present invention, illustrating the gauge in its position when the tank is nearly empty.

Referring to FIG. 1, there is illustrated a tank 10, with which the present invention may be used. The tank 10 is a generalized tank for purposes of illustration, and it will be appreciated that specific types of tanks, such as barge tanks or railway car tanks, e.g., may differ in specific structural details. The tank 10 has a side wall 11, a bottom wall 12 and a top wall 13. A liquid 14 may be stored within the tank 10. The top wall 13 has an opening therein with which a nozzle 15 is aligned. The nozzle 15 extends upwardly from the top wall 13 and includes a cylinder 16 welded thereto. A ring-shaped flange 17 is welded to the top of the cylinder 16 and a mounting plate 18 is attached to the flange 17, as by bolts 19 (only two of which are shown).

A gauge 20, constructed in accordance with and embodying the features of the present invention, is provided for determining the level of the liquid 14 within the tank 10. The gauge 20 includes an elongated guide tube 21 which is preferably composed of corrosion-resistant, non-magnetic material in order to withstand corrosive liquids which may be stored in the tank 10. The guide tube 21 extends through a complementary opening in the mounting plate 18, and is fixed thereto, as by weldments 22. The guide tube 21 has an upper end 23 which may be externally threaded. A sealing plug or cap 24 is seal welded on the lower end of the guide tube 21. A bushing 25 is disposed in the upper end 23 of the guide tube 21 and has an axial bore therethrough. An inverted cup-shaped cap 26 closes the upper end 23 of the guide tube 21 and may be threadedly engaged therewith, the cap 26 having an axial bore therethrough coaxial with the bore in the bushing 25.

The gauge 20 includes a float 30 having a hollow, substantially spherical shell 31 and a central tube 32 hermetically attached together. The guide tube 21 passes coaxially through the float tube 32 so that the float 30 can freely move along the guide tube 21 with change in liquid level. The float 30 is also preferably made of a corrosion-resistant, non-magnetic material. A ring-shaped magnet 33 is mounted within the float 30 and encircles the tube 32, being fixed to the tube 32 and/or to the inner surface of the shell 31.

The gauge 20 also includes an elongated cylindrical gauging rod or tube 35 which is disposed coaxially within the guide tube 21, with the upper end of the gauging rod 35 extending through the coaxial bores in the bushing 25 and the cap 26. Fixed to the lower end of the gauging rod 35 is a cylindrical magnet 36, which magnetically couples the gauging rod 35 to the float magnet 33 and, thereby, to the float 30, in a known manner, so that the gauging rod 35 rises and falls with the float 30 as the level of the liquid 14 rises and falls.

Figure 2:
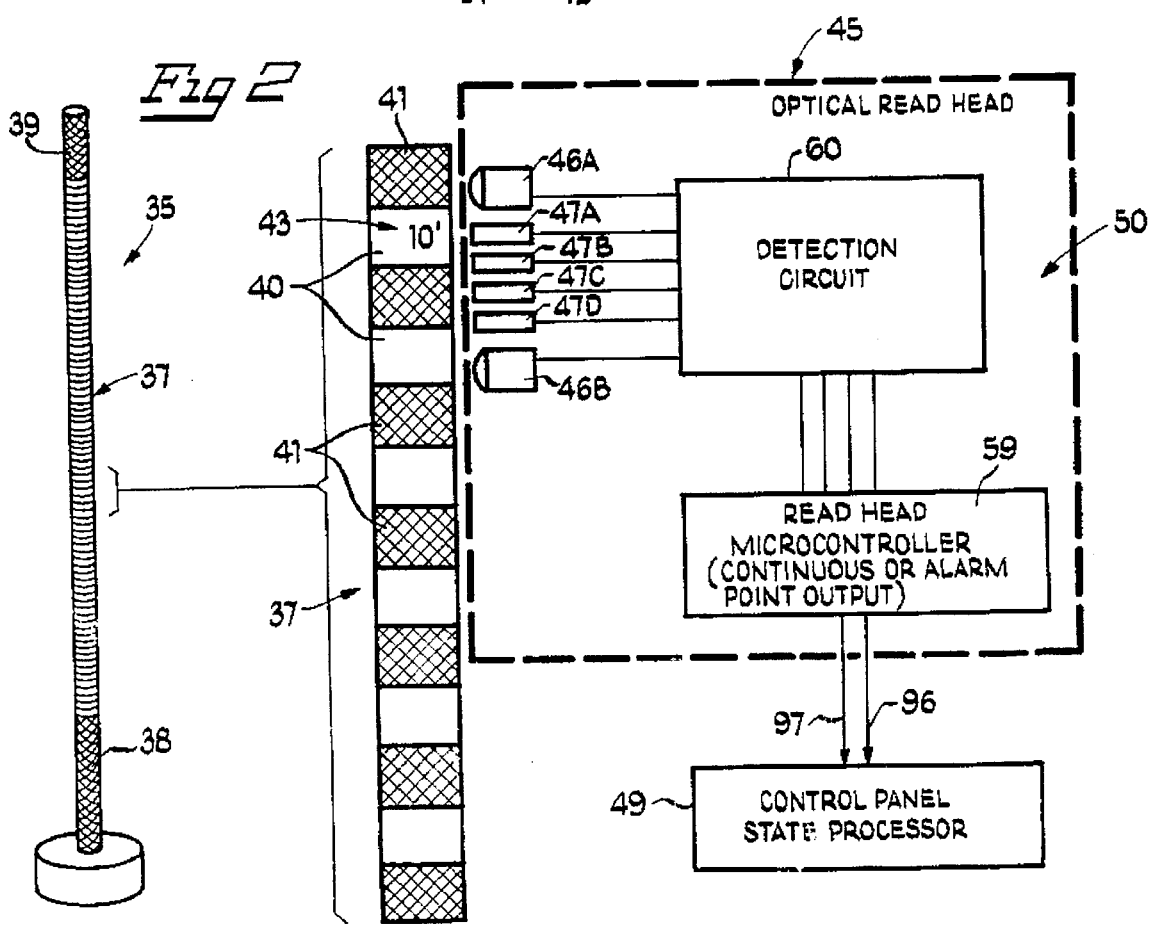
FIG. 2 is an enlarged diagrammatic view of the gauge rod of the tank level gauge of FIG. 1, showing the cooperation thereof with the associated optical read head.

Referring also to FIG. 2, the gauging rod 35 has a cylindrical code-bearing outer surface 37. The code-bearing surface 37 has dark or non-reflective zones 38 and 39, respectively at the lower and upper ends thereof, each of the zones 38 and 39 preferably being covered around the entire circumference of the surface 37 with a black or otherwise non-reflective color. The remainder of the code-bearing surface 37, intermediate the zones 38 and 39, is provided with alternating light and dark stripes 40 and 41, each extending around the circumference of the surface 37 and each having the same longitudinal height. The light stripes 40 are light-reflecting and may comprise a coating of a white or other suitable light-reflecting color, while the dark stripes 41 are non-reflecting and may be of the same type as the dark zones 38 and 39. It will be appreciated that the zones 38 and 39 and the stripes 40 and 41 comprise the code indicia of the code-bearing surface 37. If desired, human-readable indicia 43 could also be provided on the light stripes 40, as will be discussed further below.

The gauge 20 also includes a code sensor in the form of an optical read head 45, which is preferably mounted on the cap 26 alongside the gauging rod 35, as illustrated in FIG. 1. The contents of the optical read head 45 are illustrated in functional block form in FIG. 2 and in schematic form in FIG. 3. The optical read head 45 includes a pair of light sources, such as light-emitting diodes ("LEDs") 46A and 46B disposed for illuminating the adjacent portion of the code-bearing surface 37. The LEDs 46A and 46B flank an array of four optical sensors, such as photodiodes 47A–47D, which are preferably arranged in two pairs, each of which is arranged in quadrature relationship relative to the code-bearing surface 37. More specifically, the spacing of the photodiodes 47A–47D is such that each "reads" a region of the code-bearing surface 37 having a vertical or longitudinal extent at least one-half the height of a stripe 40 or 41. Preferably, the field of view of each of the photodiodes 47A–D is approximately the height of a stripe 40 or 41. Thus, there may be some overlap in the fields of view of adjacent photodiodes. In general, it is desirable that the field of view of each photodiode be sufficiently wide that, in the event that human-readable indicia 43 are placed on white stripes 40, the photodiode will not mistake the indicia for a dark stripe. However, the field of view should not be significantly wider than the height of a stripe, so that the photodiode cannot simultaneously detect an entire light stripe plus an entire dark stripe, in which case it would not be able to distinguish between light and dark stripes.

Preferably, the photodiodes of each pair are disposed 90° out of phase with each other. For example, considering the pair of photodiodes 47A and 47B, when the photodiode 47A is in the center of a stripe so as to be detecting all white (or all dark) the photodiode 47B is at the boundary between two stripes so it is detecting half light and half dark. It will be appreciated that this condition will be true when the two photodiodes of a pair are spaced apart by odd multiples of one-half stripe width, e.g., ½, ³⁄₂, ⁵⁄₂, etc. Preferably, the pairs of photodiodes are disposed 180° out of phase, so that when a photodiode of one pair is disposed in the center of a white stripe so as to be detecting all light, the corresponding photodiode of the adjacent pair is in the center of a dark stripe, so as to be detecting all dark. It will be appreciated that this is true if the pairs are spaced apart by odd multiples of a stripe width, e.g., 1, 3, 5, etc.

The height of the stripes 40 and 41 will determine the resolution of the gauge 20 and, thereby, the precision of the level measurements, the resolution being proportional to the height of the stripes. It will be appreciated that if the height of the stripes changes, the spacing and field of view of the photodiodes 47A–D would be changed accordingly. While, in the illustrated embodiment, two light sources 46A and 46B are utilized, it will be appreciated that a single source could be used as long as it illuminates the region in the field of view of the optical sensors 47A–D. The optical read head 45 outputs signals to an associated control panel state processor 49 for providing liquid level indications to a user, as will be explained more fully below.

Figure 3:
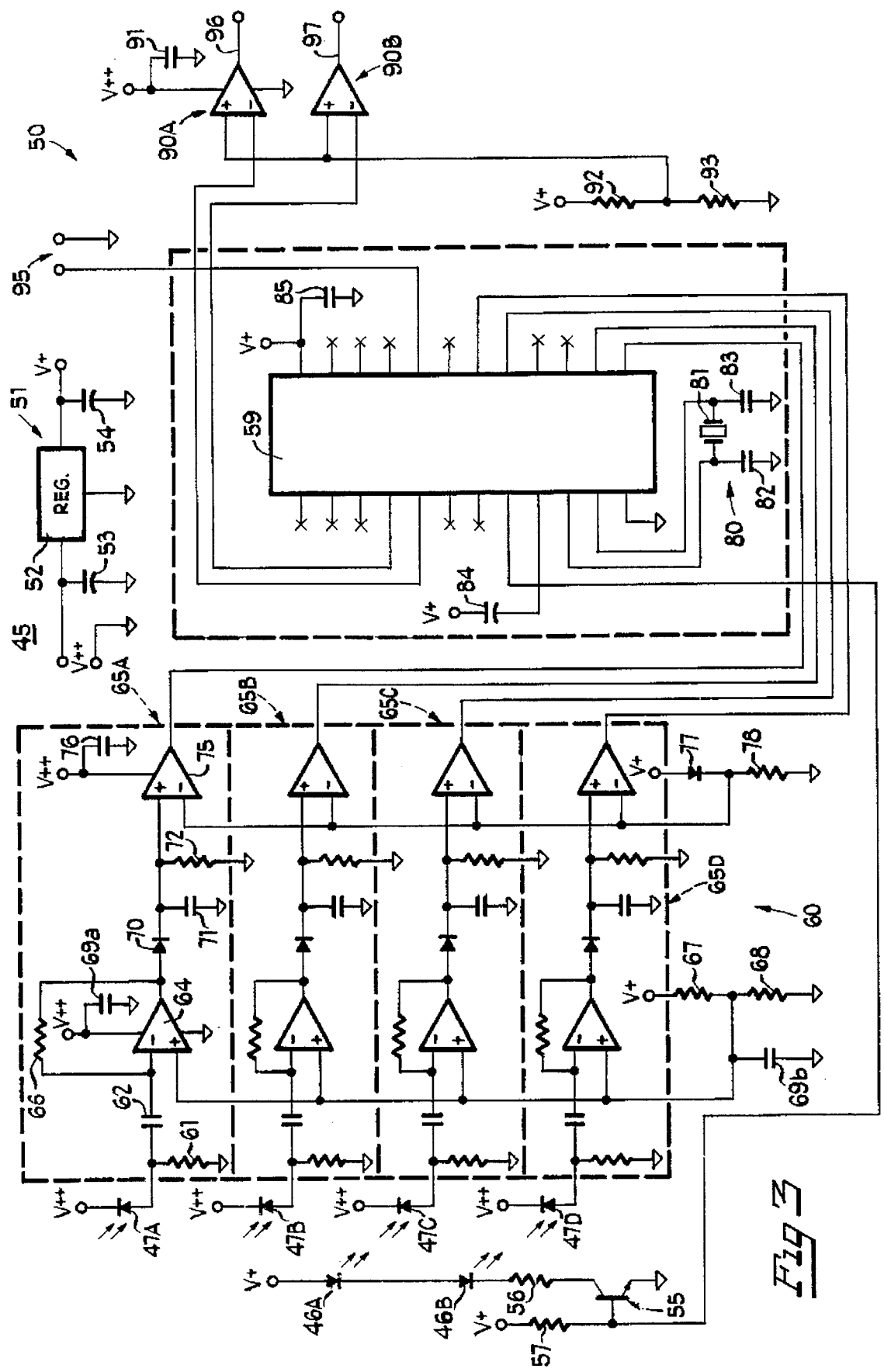
FIG. 3 is a schematic circuit diagram of the circuitry of the optical read head of FIG. 2.

Referring now also to FIG. 3, the optical read head 45 also includes a control circuit 50, which includes a power supply 51, a microcontroller 59 operating under stored program control, and a detection circuit 60. The power supply 51 includes a voltage regulator 52 and associated capacitors 53 and 54 and converts a DC supply voltage V++ which may, for example, be 12 VDC, to a V+ voltage such as, for example, 5 VDC in a known manner. Connected in series between the V+ supply and ground are the LEDs 46A and 46B, the collector-emitter junction of a transistor 55 and a resistor 56. The base of the transistor 55 is connected to the V+ supply through a resistor 57 and is also connected to an output pin of the microcontroller 59 which generates a high-frequency pulsed current waveform, which preferably has a frequency of about 20 KHz and 50% duty cycle with a peak current of approximately 80 mA. Thus, it will be appreciated that the LEDs 46A and 46B are modulated, being turned on and off at the 20 KHz rate.

Each of the photodiodes 47A–D has its cathode connected to the V++ supply and its anode connected to a corresponding one of four amplifier-demodulator circuits 65A–65D, which are substantially identical in construction, so that only the circuit 65A will be described in detail. The anode of the photodiode 47A is connected to one plate of a capacitor 62, which plate is also connected to ground through a current drain resistor 61. The other plate of the capacitor 62 is connected to the inverting input of an operational amplifier ("op amp") 64, which terminal is also connected to the output of the amplifier 64 through a feedback resistor 66. The non-inverting input of the amplifier 64 is connected to the junction between resistors 67 and 68, which form a voltage divider connected in series between the V+supply and ground. It will be appreciated that the amplifiers 64 for the several circuits 65A–D may constitute a quad op amp connected to the V++ supply voltage. An AC shunt capacitors 69a and 69b are, respectively, connected in parallel with the amplifiers 64 and the resistor 68.

The output of the amplifier 64 is connected to the anode of a rectifying diode 70, the cathode of which is connected to the non-inverting input of an op amp configured as a comparator 75. A capacitor 71 and a resistor 72 are connected in parallel between the cathode of the diode 70 and ground, the capacitor 71 serving to preserve the peak voltage at the output of the diode 70 and the resistor 72 serving as a current drain. The inverting input of the comparator 75 is connected to the junction between a diode 77 and a resistor 78, which form a voltage divider connected in series between the V+ supply and ground. It will be appreciated that the comparators 75 of the circuits 65A–D may form parts of a quad op amp supplied with the V++ supply voltage and connected in parallel with an AC shunt capacitor 76.

The outputs of the comparators 75 are, respectively, input to the microcontroller 59 at bits 0, 1, 4 and 5 of one port of the microcontroller, which observes the states of these input lines and their transitions to track the position of the gauging rod 35.

A crystal 81 is connected across clock terminals of the microcontroller 59, which terminals are connected to ground through capacitors 82 and 83, respectively, to form an oscillating circuit to control the clock frequency of the microcontroller 59. A reset terminal of the microcontroller 59, is connected through a reset capacitor 84 to the V+ supply. The V+ supply voltage is also supplied to a supply terminal of the microcontroller 59, which is shunted by a bypass capacitor 85.

The outputs from the microcontroller 59 are taken at the two lowest order bits of a second port and are, respectively, input to the inverting input terminals of buffer op amps 90A and 90B configured as comparators. The non-inverting inputs of these comparators are connected to the junction between resistors 92 and 93, which form a voltage divider connected in series between the V+ supply and ground. The comparators 90A and 90B may be embodied in a quad op amp, supplied with the V++ supply voltage shunted by a bypass capacitor 91. The outputs of the op amps 90A and 90B are, respectively, fed via lines 96 and 97 to the control panel state processor 49.

Preferably, the microcontroller 59 is programmed to provide a serial output pulse train on one of the output lines, the other being used to provide a clock signal for syncing the output. The serial output data can give an indication of discrete alarm levels or a continuous indication of absolute liquid level, depending upon the condition of a configuration bit input at the highest order bit of port 1. When a jumper wire is present between the contact terminals 95, the input is held low to ground and when it is absent or cut, the input is allowed to be pulled high by an internal pull-up resistor.

In operation, the microcontroller 59 outputs a square wave which is buffered by the transistor 55, which powers the LEDs 46A and 46B with a 50% duty cycle current, turning the LEDs on and off at a 20 KHz rate to modulate their light output at the 20 KHz modulation frequency. The light from the LEDs 46A and 46B, which may be infrared emitters, illuminates the adjacent portion of the code-bearing surface 37 of the gauging rod 35. The modulated infrared light which is reflected from the code-bearing surface 37 is detected by the photodiodes 47A–D. The voltages at the anodes of the photodiodes are proportional to the strength of the infrared light striking them. These signals are AC decoupled by the capacitors 62, then amplified by the amplifiers 64 and rectified by the diodes 70. The DC level at the non-inverting input of each comparator 75 represents the strength of the light striking the associated one of the photodiodes 47A–D. These DC signals change relatively slowly (typically less than 100 Hz for reasonable gauging rod motions), and are compared by the comparator 75 with a reference voltage created by the voltage divider comprising the diode 77 and the resistor 78.

Basic liquid level determination is performed using the well-known quadrature encoding technique, with the photodiodes 47A–D being arranged in two quadrature pairs. The pattern of logic levels from each of these pairs can indicate the direction in which the liquid level is changing, in a known manner, described, for example, in U.S. Pat. No. 5,245,874. The microcontroller maintains a count of the light/dark transitions relative to a reference level to determine absolute position.

An important feature of the present invention is the use of four detectors instead of a single quadrature pair. This arrangement, together with the provision of the dark zones 38 and 39 at the ends of the gauging rod 35, afford significant advantages. Each of the dark zones 38 and 39 has a longitudinal extent or length at least as great as the height of two stripes 40, 41 such that, in either of the full or empty conditions, the fields of view of all four photodiodes 47A–D will be completely within one or the other of the dark zones 38 and 39, so that the outputs of all four of the photodiodes 47A–D will be "dark". This will uniquely indicate that the rod 35 is in one of its two limit positions since, in any other position, at least one of the photodiodes will register "light". The length of the gauging rod 35 is such that these zones 38 and 39, respectively, correspond to the full and empty conditions of the tank. Furthermore, by interpreting the sequence of transitions by which the photodiodes enter and leave the all-dark condition, the microcontroller 59 can interpret which of the zones 38 and 39 is being entered or exited. These end zones 38 and 39 establish reference levels for the counting operation Of the microcontroller 59.

The unique arrangement of four photodiodes also means that, in normal operation, at least one of the photodiodes will always be registering a "dark" output. Thus, this constitutes a fail-safe feature since, if all of the photodiode outputs are "light," this indicates a fault condition. Also, by following the pattern of transitions between light and dark of the several photodiodes 47A–D, the microcontroller 59 can detect aberrant patterns which would indicate failure or disconnection of a photodiode.

Another significant aspect of the invention is that the modulation of the light source significantly reduces sensitivity to background light, which would normally be at a static level and would be essentially filtered by the capacitors 62. The output of each rectifying diode 70 is essentially the average strength of the modulated detected light, which is then compared to a fixed threshold to accurately determine whether the associated photodiode is viewing a light stripe or a dark stripe.

Because of the use of four photodetectors 47A–D, reduced sensitivity to ambient light could be achieved even without modulation of the LEDs. In this case, the average or total light level detected by all photodiodes 47A–D is constant and could be used as a threshold level for comparison with each one to determine the logic level of the detector. This would substantially reduce sensitivity to background light levels that could be troublesome if only one pair of detectors were used.

The microcontroller 59 observes the ON-OFF state of the four signals coming from the amplifier-demodulator circuits 65A–D and utilizes the state transitions to track the position of the gauging rod 35. Thus, the microcontroller 59 tracks the position of the gauging rod 35 and generates a serial output data stream which will indicate either that a predetermined alarm level has been reached, or will give a continuous reading of the absolute position of the gauging rod 35, depending upon the mode of operation of the microcontroller 59, as determined by the condition of the jumper contacts 95.

Figure 4:
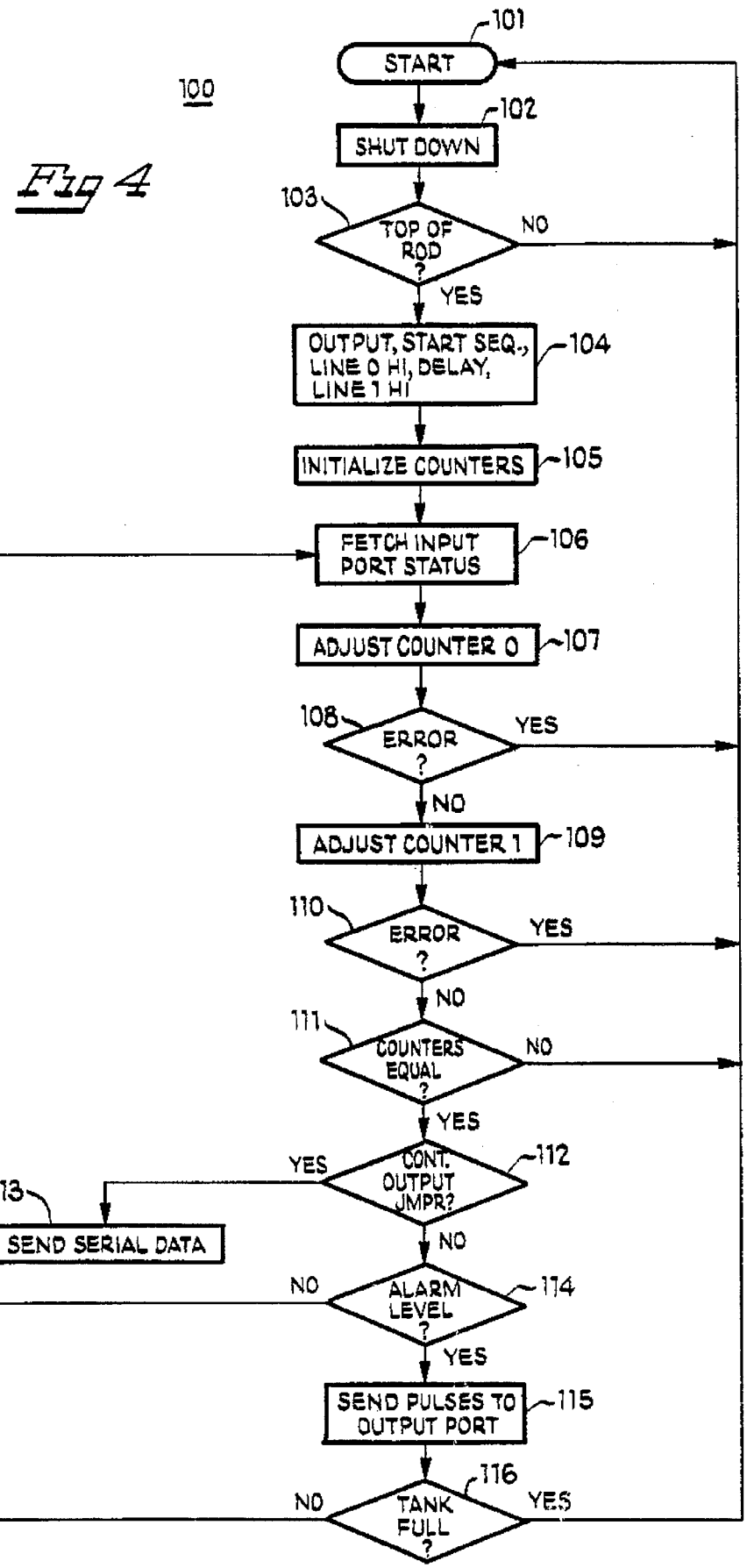
FIG. 4 is a flow diagram of the software program for the microcontroller of the circuit of FIG. 3.

Referring now to FIG. 4, there is illustrated a flow chart of the program software 100 for the microcontroller 59. When the control circuit 50 is powered up at 101, it moves at 102 to a shutdown condition, which is a default state, awaiting detection of movement of the gauging rod 35, since the gauging function of the control circuit 50 can only work if the gauging rod 35 is moving. Normally, when the depth gauge 20 is not in use, the gauging rod 35 is in a rest position fully retracted into the tank 10, with the top of the rod adjacent to the read head 45. If the tank is not empty, the magnets 33 and 36 will be decoupled. After power up, the gauging rod 35 is manually raised sufficiently to couple the magnets 33 and 36. When rod movement is detected by the outputs of the photodiodes 47A–D, the program checks at 103 to see if the pattern of photodiode outputs indicates that the optical read head is leaving the dark zone 39 at the top of the gauging rod 35, indicating that the tank is empty. If the read head 45 is not at the top of the rod, the program returns to the default condition at 102. If it is at the top of the rod, the program proceeds to a start sequence at 104, wherein both of the output lines 96 and 97 go high. Then two software counters, one for each quadrature pair of the photodiodes 47A–D, are initialized at 105.

The program then checks the status of the input ports of the microcontroller 59 at 106, adjusts counter 0 at 107 and then checks at 108 to see if an error is indicated. If it is, the program returns to the default condition at 102. If there is no error the program adjusts counter 1 at 109 and again checks for errors at 110. If there are no errors, the program checks at 111 to see if the states of the counters are substantially equal, i.e., within one count of each other. If they are not, this indicates that something is wrong and the program returns to the default condition at 102. If the counters are equal, the program checks at 112 to see if the jumper is in place at the contacts 95. If it is, then the system is set to provide a continuous output reading of absolute position of the gauge and, accordingly, the program sends the position as a serial data stream to the output port at 113, and the program returns to 106 to again check the status of the input ports. If the jumper is not in place, then the program is set to detect alarm levels. Accordingly, the program checks at 114 to see if an alarm level has been reached. If not, the program returns to 106 to continue checking the status of the input ports. If an alarm level has been reached, the program sends the level indicating pulses to the output port at 115 and then checks at 116 to see if the tank is full, as determined by the photodiode outputs indicating that the optical read head 45 has entered the dark zone 38 at the bottom of the gauging rod 35. If the tank is not full, the program returns to again continue checking the status of the input ports at 106. If the tank is full, the program reverts to the default condition at 102.

The microcontroller outputs, which can source only a relatively small amount of current, are buffered by the push-pull op amps 90A and 90B, which can sink and source up to 8 mA. The output signals from the microcontroller 59 are supplied to the control panel state processor 49, which may produce a suitable output signal display indicating the alarm level or the absolute level position in user-readable format.

As was indicated above, there may also be provided user-readable indicia 43 on the gauging rod 35, which can be directly read by a user without the use of the optical read head 45. Preferably, these indicia are so arranged on the light stripes 40 that they do not excessively change the optical reflectance of the light stripes. Because the stripes 40 and 41 extend circumferentially around the gauging rod 35, the rod can rotate to any orientation without affecting the optical readout.

In a constructional model of the invention, the microcontroller 59 may be an 87C750, the transistor 55 may be a 2N2222, the amplifiers 64 may be an LF347, the comparators 75 may be an LM339, and the comparators 90A and 90B may be a TLC3704.

From the foregoing, it can be seen that there has been provided an improved optical float gauge for determining liquid level in a tank, the gauge providing both electronic and directly-visible level indications, the ability to detect both full and empty conditions, the ability to detect absolute liquid level as well as discrete alarm levels and to provide user selection between these modes of operation, a fail-safe encoding technique to indicate invalid states of the detectors, and relative immunity to ambient light.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A float gauge for measuring liquid level in a vessel comprising: a float element floating in the liquid for rising and falling with the level thereof, an elongated code-bearing surface coupled at one end thereof to the float element for rising and falling therewith, a code sensor fixed relative to the vessel and disposed for sensing movement of the code-bearing surface and generating corresponding electrical signals, said code sensor including four optical detectors coupled relative to the code-bearing surface for generating electrical signals in a relationship indicating the direction and rate of movement of the code-bearing surface and the integrity of the code sensor, and a processor coupled to said code sensor for interpreting said electrical signals and generating corresponding output signals indicative of the liquid level.

2. The float gauge of claim 1, wherein said optical detectors include two pairs of sensors with each pair coupled in quadrature relationship with respect to the code-bearing surface.

3. The float gauge of claim 1, wherein said code-bearing surface includes a plurality of equal-height reflecting and non-reflecting stripes alternating longitudinally along the surface.

4. The float gauge of claim 3, wherein each of said optical detectors reads a longitudinal extent of said code-bearing surface substantially equal to the height of a stripe.

5. The float gauge of claim 3, wherein said code-bearing surface includes elongated non-reflecting portions respectively at the opposite ends thereof, with each of said portions having a length at least as great as the height of two stripes.

6. The float gauge of claim 1, wherein said code sensor includes a light source for illuminating said code-bearing surface.

7. The float gauge of claim 6, wherein said light source includes a light-emitting diode.

8. The float gauge of claim 1, and further comprising means magnetically coupling said float element to said code-bearing surface.

9. The float gauge of claim 3, wherein said code-bearing surface is a cylindrical surface, each of said stripes extending circumferentially around said cylindrical surface.

10. A float gauge for measuring liquid level in a vessel comprising: a float element floating in the liquid for rising and falling with the level thereof; an elongated code-bearing surface coupled at one end thereof to the float element for rising and falling therewith and including reflecting and non-reflecting portions; and a code sensor, said code sensor including a light source disposed for illuminating said code-bearing surface, a control circuit coupled to said light source for modulating the light output thereof by alternately turning said light source on and off at a fixed rate much higher than the maximum rate of transition between reflecting and non-reflecting portions, an optical sensor for detecting modulated light reflected from the code-bearing surface and generating electrical signals in response thereto, and detection circuitry coupled to said optical sensor for demodulating said electrical signals and comparing the voltage level of said electrical signals with a predetermined threshold voltage level.

11. The float gauge of claim 10, wherein said detection circuitry includes means for rectifying said electrical signals.

12. The float gauge of claim 10, wherein said control circuit includes a processor operating under stored program control.

13. The float gauge of claim 12, wherein said processor generates a serial output signal indicative of the liquid level.

14. A float gauge for measuring liquid level in a vessel comprising: a float element floating in the liquid for rising and falling with the level thereof; an elongated code-bearing surface coupled at one end thereof to the float element for rising and falling therewith and including reflecting and non-reflecting portions; a code sensor, said code sensor including a light source disposed for illuminating said code-bearing surface, a control circuit coupled to said light source for modulating the light output thereof, four optical detectors coupled relative to the code-bearing surface for detecting modulated light reflected therefrom and generating electrical signals in response thereto in a relationship indicating the direction and the rate of movement of the code-bearing surface and the integrity of the code sensor, and detection circuitry coupled to said optical sensor for demodulating said electrical signals and comparing the voltage level of said electrical signals with a predetermined threshold voltage level; and a processor coupled to said code sensor for interpreting said electrical signals and generating corresponding output signals indicative of the liquid level.

15. The float gauge of claim 14, wherein said optical detectors include two pairs of detectors with each pair coupled in quadrature relationship with respect to the code-bearing surface.

16. The float gauge of claim 15, wherein said code-bearing surface includes a plurality of equal-height reflecting and non-reflecting stripes alternating longitudinally of the surface, said optical detectors being equidistantly spaced apart longitudinally of the code-bearing surface such that each of said optical detectors reads a longitudinal extent of said code-bearing surface substantially equal to the height of a stripe.

17. The float gauge of claim 16, wherein said code-bearing surface includes elongated non-reflecting portions respectively at the opposite ends thereof, with each of said portions having a length at least as great as the height of two stripes.

18. The float gauge of claim 14, wherein said control circuit includes a means for alternately turning said light source on and off at a rate much higher than the maximum rate of transition between reflecting and non-reflecting portions, said detection circuitry including means for rectifying said electrical signals.

* * * * *